(No Model.)
C. M. MENEFEE & G. ERTEL.
CISTERN COVER.
No. 505,055. Patented Sept. 12, 1893.
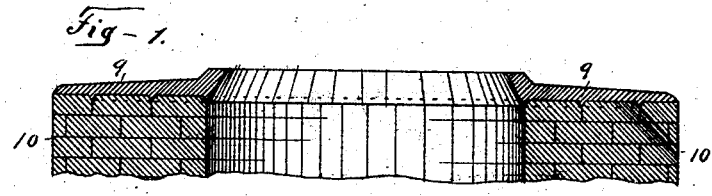
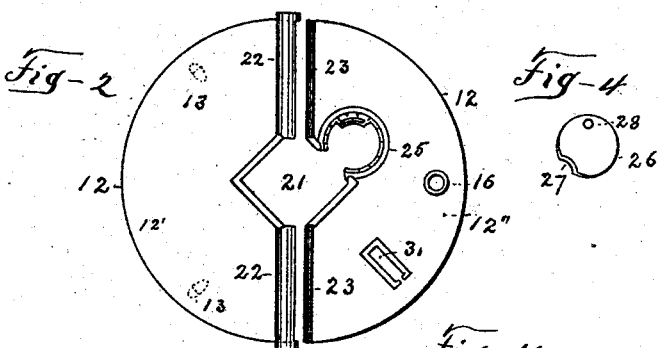
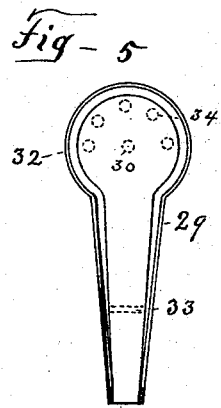
WITNESSES:
N. G. Burns
Albert Baker
Charles M. Menefee
George Ertel
INVENTORS
BY
H. C. Hartman
ATTORNEY

UNITED STATES PATENT OFFICE.

CHARLES M. MENEFEE AND GEORGE ERTEL, OF FORT WAYNE, INDIANA.

CISTERN-COVER.

SPECIFICATION forming part of Letters Patent No. 505,055, dated September 12, 1893.

Application filed February 27, 1893. Serial No. 463,789. (No model.)

*To all whom it may concern:*

Be it known that we, CHARLES M. MENEFEE and GEORGE ERTEL, citizens of the United States, residing at Fort Wayne, in the county of Allen, in the State of Indiana, have invented certain new and useful Improvements in Cistern-Covers; and we do hereby declare that the following is a full, clear, and exact description of the invention, which will enable others skilled in the art to which it appertains to make and use the same, reference being had to the accompanying drawings, which form part of this specification.

Our invention relates to improvements in cistern, well and catch basin covers, in which one part is stationary and another part is removable.

The objects of our improvement are, first, to provide an improved removable cap; second, an improved means to secure the cap to the stationary part or outer rim of the cover, and third to provide a combined ventilating shaft and adjustable valve rod entrance to the cap.

Other objects will appear in the description.

The invention consists in the construction and novel combination of parts hereinafter described, pointed out in the appended claims and illustrated in the accompanying drawings in which—

Figure 1 is a cross section of the stationary part or outer rim attached to the neck of a cistern. Fig. 2 is a top view of the cap with its two parts slightly separated. Fig. 3 is a side view of the cap as shown in Fig. 2. Fig. 4 is a top view of the cover of the ventilating shaft in Fig. 2. Fig. 5 is a top view of a spout. Fig. 6 is a side view of a spout. Fig. 7 is an enlarged side view of the locking device; and Fig. 8 is a bottom view of the device shown in Fig. 7.

Similar numerals of reference refer to simi- parts throughout the several views.

The construction, preferably of iron, is as follows: The outer rim of the cover 9 is annular in form, and of a width to correspond with the thickness of the walls 10 of the neck of the cistern or well. The inner edge of this outer rim 9 is constructed at an acute angle to the surface forming a beveled edge as shown in Fig. 1 or the edge may be recessed. The cap 12 is provided with one or more lugs 13, preferably two, on its under surface adapted to engage the inner edge of the rim 9 and hold the cap in place. A preferable form of the lug 13 is shown in the drawings and consists in making the outer portion of the lug angular or beveled so as to conform to the beveled edge of the outer rim. This cap 12 is also provided with means to lock it in place and clasp it to the outer rim 9. A preferable locking device is shown in the drawings, Figs. 2, 7 and 8. It consists of a short bolt 14 provided with a flange or shoulder 15, to prevent the bolt passing or dropping through the orifice 16 in the cap, a head 17 for turning, and a stud 18 attached to the lower end of the bolt, and provided with an outer surface having a circular rim eccentric to the circle of the bolt and chamfered inwardly to coincide with and engage the beveled edge 11 of the rim 19. This stud is preferably placed on one side of the lower end of the bolt 14 as shown in Fig. 8, because such position gives a greater throw when the bolt is turned, and thereby forces the cap, to which the bolt is connected, farther toward the opposite edge, thereby better engaging the lugs 13 with the chamfered or beveled edge of the outer rim 9, the function of the chamfered edges of rim, lugs and stud being to draw the cap or cover down firmly against the outer rim 9. We prefer to make this eccentric edge and chamfered side of the stud 18 in form of an involute curve as shown in Fig. 8, because such form gives a better increasing throw when the bolt is turned. When the cap 12 is placed on the rim 9, the bolt is passed through the orifice 16 in the cap 12, and turned with a wrench applied to the nut. As soon as the curved edge 19 of the stud 18 engages the edge of the rim 9, the tendency of the pressure is to force the opposite edge or side of the bolt upward out of the orifice 16, which may be avoided by slow turning and care. But we prevent this by constructing a V shaped projection 20 (or recess the bolt to form such a V shaped projection) on the lower edge of that side of the bolt, which projection 20 engages the under side of the cap 12 and holds the bolt in place. As the bolt is further turned, the cap 12 is forced toward the opposite side of the rim 9 causing the lugs 13 to engage the beveled edge 11 of the outer rim 9 thereby drawing the cap down firmly on to the rim 9. The beveled edge 19 of the stud 18 performs the same function on the opposite side, so that the cap 12 is held down firmly against the rim at three or more places.

Where it is desired to pass a pump stock through the cap 12, we construct the cap 12 in two half parts 12' and 12" and cut out a square hole 21 in the center of the cap so that the line of division is diagonally across the square. One of the straight edges of the divided cap is provided with a projecting flange 22 adapted to cover the other straight edge 23 when in position, and is also adapted to cover the ends of the joint for the purpose of aiding in holding the cap 12 down and to protect the joint from the entrance of dirt or vermin. These two half parts of the cap 12 are held down by the two lugs 13 on one part and by the stud 18 on the other part, in the same manner as if formed in one piece. This square hole 21 is made so as to receive a square pump stock of the regular size loosely and the throw of the locking device and the construction of the parts as shown are adapted to bind such pump stock closely in place. The distance or throw of the locking device is determined by and is exactly the distance from the center of the bolt to the outermost point of the involute curve of the stud 19. If such distance is one inch, the cap 12 can be moved one inch by turning the bolt and a greater throw can be had by making the stud 18 with larger eccentric or involute curve.

We also provide a ventilating shaft 25 to the lid and place it preferably on the cap 12 next to the pump stock hole 21. It consists of a short shaft 25 passing through the cap 12 or coinciding with an opening in the cap of the same size, and its upper part projected above the surface of the lid or cap 12. The top or edge is corrugated slightly as shown in Fig. 3 so that when its cover 26 is placed, small openings for the passage of air will be made between the top of the shaft and its cover, but not large enough for the entrance of bugs or vermin. Small orifices for like purpose may also be made in the walls or sides of the shaft 25.

Where a pump stock is used which is provided with a valve below the surface for the exit of water to prevent its freezing inside the pump stock, which is a common construction for such purpose where pumps are used out doors, we provide an adjustable opening for the rod which operates such valve. It consists in cutting out an opening or recess 27 in the cover 26 of the ventilating shaft, slightly smaller than the valve rod, next to the pump stock, cutting out also part of the wall of the ventilating shaft. The cover is secured in place by a single bolt 28 which allows it to be swung up against the valve rod closely and secures the cover in place.

We also provide a trough or spout 29 adapted to this cover which consists in providing the bottom of the receiving part of the spout with a centrally placed lug 30 whereby the receiving part of the spout is held in place adjustably, by the movement of the lug in a groove 31 constructed in the cap, so that the water falling from the spout of the pump stock will fall into the receiving part 32 of the trough or spout. The other end of this trough is also supported by a lug 33, the two lugs supporting the trough at any required angle without other contact of the bottom. The trough is supported laterally by lugs 34 placed under the receiving part adapted to hold it level or nearly so transversely. By this construction the trough or spout is adjustable to the pump stock, and can be placed in any direction required, the lugs supporting it in correct position, at all directions. But we do not claim this spout as new. It is shown as a convenient form only.

Having thus described our invention, what we claim as new, and desire to secure by Letters Patent, is—

1. A cistern cover consisting of an annular metallic rim recessed or beveled on its inner edge and adapted to be secured to the neck of a cistern or other opening in combination with: a removable cap for said rim provided with a lug or lugs on its under surface adapted to engage the recessed or beveled edge of the rim and an orifice for a locking device: and a locking device consisting of the bolt 14, projection 20, the washer 15, the bolt head 17 and the stud 18 substantially as described.

2. In a cistern cover, an annular metallic rim adapted to be secured to the neck of a cistern or other circular opening: in combination with a removable metallic cap or cover for said rim constructed in two half parts and provided with the opening 21 for a square pump stock: a lug or lugs on the under surface of one of the half parts of said caps adapted to engage the inner edge of the rim and hold the cap in place: an orifice on the other half of said rim for a locking device: a locking device operating through and in said orifice adapted to force the said lug or lugs into engagement with the rim and to clamp the part of the cap to which it is attached to the outer rim.

3. In a cistern cover, an annular metallic rim adapted to be secured to the neck of a cistern or other opening: in combination with a removable cap or cover for the rim, constructed in two half parts and provided with an opening for a pump stock: a lug or lugs on one of the half parts of said cap adapted to engage the inner edge of the rim and hold the part firmly to it: an orifice in the other half of said rim for the locking device: a locking device adapted to force the said lug or lugs into engagement with the rim, and to clamp the part to which it is attached to the rim; and the projecting flange 22.

4. In a cistern cover, an annular metallic rim adapted to be secured to the neck of a cistern or other opening: in combination with a removable cap or cover for the rim constructed in two half parts and provided with an opening for a pump stock: a lug or lugs on one of the half parts of said cap adapted to engage the inner edge of the rim and hold the part firmly to it: an orifice in the other half of said rim for the locking device: a locking device adapted to force the said lug or lugs into engagement with the rim, and to clamp the part to which it is attached to the rim: the projecting flange 22: a ventilating shaft provided with means to exclude bugs and vermin and admit air in small currents: and a cover to said ventilating shaft provided with a recessed opening for the rod of a discharge valve, and means to secure it in place adjustably to the rod.

5. A cover for the neck of a cistern or similar openings, consisting of an annular metallic rim provided with inwardly chamfered edges on its inner periphery; a removable cap for the opening of said rim, provided with an orifice for a bolt; a bolt provided with a flange or shoulder and a head for turning; a stud attached to the lower end of the bolt, having an outer surface forming a circular rim eccentric to the circle of the bolt, which is chamfered inwardly so as to coincide with the chamfered edge of said rim; and lugs on the cap on the opposite side from the bolt, adapted to engage said chamfered edge of said rim and hold the cap down upon it, when forced into close engagement.

6. As an article of manufacture, a cover for the neck of a cistern or other similar opening, consisting of an annular metallic rim, provided with inwardly chamfered edges on its inner periphery; a removable cover therefor, provided with an orifice for a bolt, and with lugs on the opposite side, chamfered to correspond with and engage the inner edge of said rim; and a locking device consisting of a bolt for said orifice, provided with a flange and head, and also with a stud adapted to force said lugs into engagement with said rim, and also to engage and hold down said cover upon the rim by turning the bolt.

7. As an article of manufacture, a cover for the neck of a cistern or other similar opening consisting of an annular iron rim, and a removable iron cover therefor constructed in two half parts and provided with a centrally placed opening for a pump stock: a flange projection on one of the half parts adapted to extend over the other so as to cover and protect the place of joining from the entrance of water and vermin and aid in holding the other part in place: a lug or lugs attached to one of the half parts and adapted to engage the rim and hold the part against it: and a locking device for the other half part adapted to force the lugs into engagement with the rim and to clamp the part to which it is attached firmly against the rim.

In testimony whereof we hereunto subscribe our names, in the presence of two witnesses, this 15th day of February, A. D. 1893.

CHARLES M. MENEFEE.
GEORGE ERTEL.

Witnesses:
H. C. HARTMAN,
H. C. SITES.